(12) United States Patent
Miyazawa

(10) Patent No.: US 8,078,149 B2
(45) Date of Patent: Dec. 13, 2011

(54) ADVERTISING INFORMATION DISPLAY METHOD, AND ADVERTISING INFORMATION DISPLAY SYSTEM

(75) Inventor: Gen Miyazawa, Tokyo (JP)

(73) Assignee: Yahoo Japan Corporation, Tokyo (JP)

( * ) Notice: Subject to any disclaimer, the term of this patent is extended or adjusted under 35 U.S.C. 154(b) by 996 days.

(21) Appl. No.: 12/015,873

(22) Filed: Jan. 17, 2008

(65) Prior Publication Data

US 2008/0113654 A1    May 15, 2008

Related U.S. Application Data

(63) Continuation of application No. PCT/JP2005/013423, filed on Jul. 21, 2005.

(51) Int. Cl.
*H04W 64/00* (2009.01)
*G06Q 30/00* (2006.01)

(52) U.S. Cl. ........ 455/414.1; 40/517; 283/2; 379/114.1; 455/456.1; 455/456.3; 700/234; 705/14.55; 705/14.64; 705/16; 705/26.1; 707/723; 709/200; 709/219; 709/227; 711/1; 715/746; 715/864

(58) Field of Classification Search ............. 379/114.13, 379/114.1; 455/414.1, 456.1, 456.3; 700/234; 705/746, 864, 718, 14.55, 14.64, 16, 26.1; 709/200, 219, 227; 283/2; 40/517; 707/723; 711/1; 715/746, 864
See application file for complete search history.

(56) References Cited

U.S. PATENT DOCUMENTS

| | | | | |
|---|---|---|---|---|
| 6,038,800 | A * | 3/2000 | Seidel ............................. | 40/517 |
| 6,484,148 | B1 * | 11/2002 | Boyd ........................ | 705/14.64 |
| 6,727,930 | B2 * | 4/2004 | Currans et al. ................ | 715/864 |
| 6,741,909 | B2 * | 5/2004 | Leatherman et al. ......... | 700/234 |
| 6,826,614 | B1 * | 11/2004 | Hanmann et al. ............. | 709/227 |
| 6,892,217 | B1 * | 5/2005 | Hanmann et al. ............. | 709/200 |
| 7,424,443 | B2 * | 9/2008 | Yanagisawa et al. ........... | 705/16 |
| 7,551,919 | B2 * | 6/2009 | Cortegiano ................ | 455/414.1 |
| 7,653,627 | B2 * | 1/2010 | Li et al. .................. | 707/999.007 |
| 7,933,898 | B2 * | 4/2011 | Lee ................ | 707/723 |
| 7,979,314 | B2 * | 7/2011 | Ulenas ........................ | 705/26.1 |
| 2002/0065068 | A1 | 5/2002 | Nobukiyo | |
| 2002/0065977 | A1 * | 5/2002 | Kindo et al. ...................... | 711/1 |

(Continued)

FOREIGN PATENT DOCUMENTS

JP        09-319303          12/1997

(Continued)

OTHER PUBLICATIONS

Supplementary European Search Report for corresponding EP Application No. 05766162.1-2414, May 16, 2011. Chinese Office Action for corresponding CN Application No. 200580048329.4, Nov. 23, 2010 (w/ Partial English translation).

*Primary Examiner* — Gerald Gauthier

(74) *Attorney, Agent, or Firm* — Ditthavong Mori & Steiner, P.C.

(57) ABSTRACT

An advertising information display method obtains the terminal location information, which is transmitted from a mobile telephone device, a terminal, retail store location information, which is transmitted from a plurality of retail stores, and advertising information, selects the neighborhood advertising information, which should be transmitted to the mobile telephone device, based on the terminal location information and a plurality of retail store location information, associates the terminal ID with the neighborhood advertising information, transmits the neighborhood advertising information to the mobile telephone device, and displays, on the display of the mobile telephone device, the neighborhood advertising information.

8 Claims, 4 Drawing Sheets

U.S. PATENT DOCUMENTS

| | | | |
|---|---|---|---|
| 2003/0187737 A1* | 10/2003 | Naito | 705/14 |
| 2004/0073538 A1* | 4/2004 | Leishman et al. | 707/3 |
| 2004/0198390 A1 | 10/2004 | Kaise | |
| 2005/0017500 A1* | 1/2005 | Brea | 283/2 |
| 2005/0282556 A1* | 12/2005 | Morris | 455/456.1 |
| 2006/0069749 A1* | 3/2006 | Herz et al. | 709/219 |
| 2008/0113654 A1* | 5/2008 | Miyazawa | 455/414.1 |
| 2009/0055273 A1* | 2/2009 | Miyazawa | 705/14 |
| 2009/0247190 A1* | 10/2009 | Miyazawa et al. | 455/456.3 |
| 2011/0061003 A1* | 3/2011 | Miyazawa et al. | 715/746 |

FOREIGN PATENT DOCUMENTS

| | | |
|---|---|---|
| JP | 2001-306567 | 11/2001 |
| JP | 2003-044552 | 2/2003 |
| JP | 2004-151954 | 5/2004 |
| JP | 2004-310524 | 11/2004 |
| JP | 2005-033464 | 2/2005 |
| WO | WO 00/62564 | 10/2000 |

\* cited by examiner

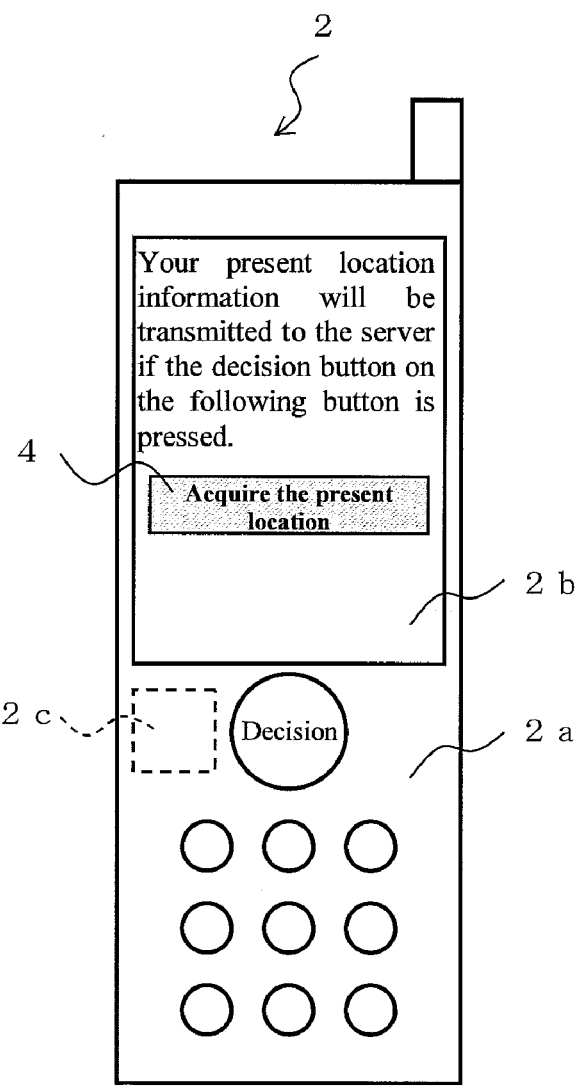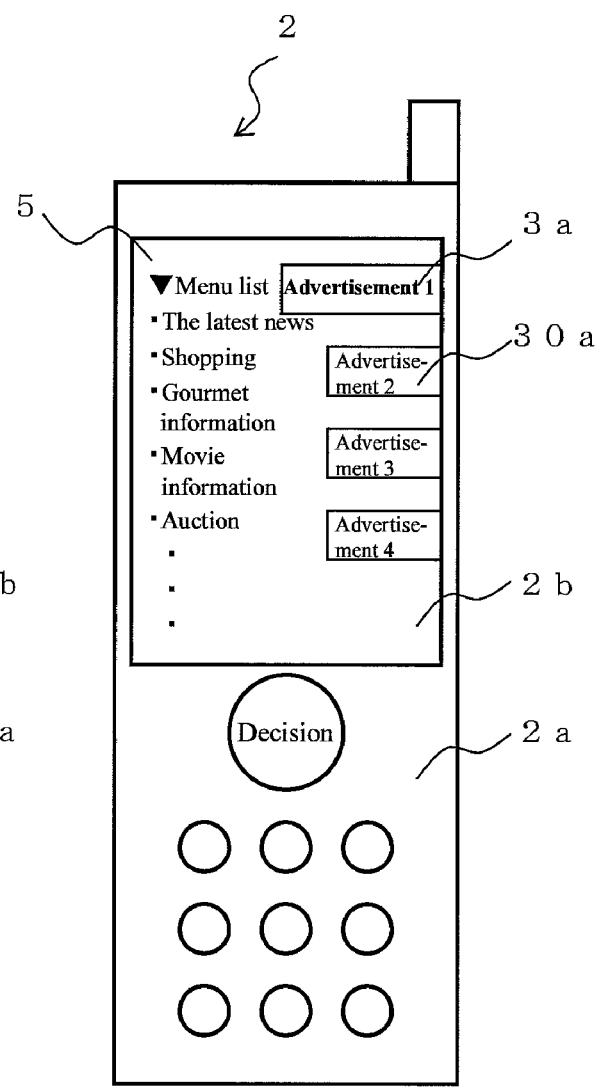

ADVERTISING INFORMATION DISPLAY METHOD, AND ADVERTISING INFORMATION DISPLAY SYSTEM

CROSS-REFERENCE TO RELATED APPLICATIONS

This application is a continuation application of PCT/JP2005/013423 filed on Jul. 21, 2005. The contents of this application are incorporated herein by reference in their entirety.

BACKGROUND OF THE INVENTION

1. Field of the Invention

The present invention relates to an advertising information display method, an advertising information display system, an advertising information display program, and an advertising information transmission program.

2. Discussion of the Background

In recent years, wireless communication terminals for performing wireless communication have been prevalent. Particularly, mobile telephone terminals that are provided with the functions of a telephone device have been significantly prevalent, owing to the convenience of the ability to easily send/receive at all times/places, as well as to their increasingly sophisticated functionality, reasonable prices, and expansion of calling areas. Mobile telephone terminals that are provided with functions to send/receive various types of information, such as email and web browsing, have been entering the mainstream of recent mobile telephone terminals. As used herein, the word terminal means a terminal device.

Recently, a service to correctly measure the location of a mobile telephone terminal (or the user thereof) has been provided, by using a location measurement system such as a GPS (Global Positioning System). This can roughly determine the surrounding circumstances, even in cases where it is an unknown place and it is difficult to determine the surrounding circumstances, for example, by obtaining one's location using the mobile telephone terminal.

A service to provide surrounding region information and store information, etc., is also performed at that time, based on the location information of the mobile telephone terminal. For example, the surrounding circumstances and the store location information can be determined at a travel destination, etc., by using this service, which is very convenient. For example, even if something should become needed suddenly, one's own location information can be obtained and transmitted, and based on that, a store where the object that is needed can be purchased can be promptly found by receiving nearby store information. Japanese Unexamined Patent Application Publication 2001-306567, Japanese Unexamined Patent Application Publication 2003-044552, and Japanese Unexamined Patent Application Publication 2004-310524 disclose examples of a mobile telephone terminal using the location information. The contents of these publications are incorporated herein by reference in their entirety.

However, it has not been possible conventionally to provide surrounding region information if the location information from the mobile telephone terminal cannot be obtained, as the surrounding region information and the store information are provided based on the location information from the mobile telephone terminal. For example, there has been the problem that when the user of the mobile telephone terminal is browsing the web using the mobile telephone terminal, it is necessary to conduct the operation of transmitting the location information repeatedly in order to obtain the advertising information that is based on the location information, whenever the user moves to a different page for browsing (generally, the server providing the information can be different when browsing to a different page, so location information has to be sent again), which is burdensome.

Additionally, in the existing technology, only the surrounding region information within the prescribed range and the store information located at the prescribed range is provided, so there is the problem that a user may not feel like going all the way to the store if the location of the store is far away from the location where the user is located, even if the store advertisement is displayed on the display of the mobile telephone terminal.

Additionally, if time has passed since the location information was obtained from the mobile telephone terminal, in some cases, the user may have been far away from the location corresponding to the location information that was obtained. In this case, because the user has already been away from the location, there is the problem that the advertising information cannot be effectively used, even in cases where the store providing the displayed advertisement is close to the location corresponding to the location information of the mobile telephone terminal.

As described above, even if the nearby store advertising information is provided by using the location information of the mobile telephone terminal, if the user cannot use it effectively, it is not only inconvenient for the user, but also, it is impossible for the store providing the advertisement to obtain advertising effectiveness.

The present invention is developed in consideration of the above circumstances, and it is an illustrative challenge to provide an advertising information display method, etc. which displays, on its display, highly useful advertising information, that is, advertising information from an advertising information transmission source (in general, a store) located at a location close to the location where a user of a mobile telephone terminal is located, by using the location information of the mobile telephone terminal represented by the mobile telephone terminal.

Additionally, other illustrative challenges are to provide an advertising information display method, an advertising information display system, an advertising information display program, and an advertising information transmission program which displays on its display highly useful advertising information by using the location information of the mobile telephone terminal previously obtained and without obtaining additional location information.

SUMMARY OF THE INVENTION

According to one aspect of the present invention, an advertising information display method, which displays, on the display of a wireless communication terminal that is capable of transmitting location information, advertising information, which is transmitted from an advertising information transmission source that is capable of transmitting location information and advertising information, and is characterized by having a step to obtain the terminal location information transmitted from the wireless communication terminal and that terminal's terminal ID information, a step to obtain transmission source location information and advertising information, which have been transmitted from a plurality of advertising information transmission sources, a step to select neighborhood advertising information, which should be transmitted to the wireless communication terminal, from among a plurality of advertising information, based on the terminal location information and a plurality of transmission source location information, a step to associate the terminal ID information with the neighborhood advertising information, a step to transmit the neighborhood advertising information, which has been associated with the terminal ID information to the wireless communication terminal, and a step to display the neighborhood advertising information on the display of the wireless communication terminal.

According to another aspect of the present invention, an advertising information display system, which displays, on the display of a wireless communication terminal that is capable of transmitting location information, advertising information, which is transmitted from an advertising information transmission source that is capable of transmitting location information and advertising information, is characterized by having an advertising server that has a function to obtain the terminal location information transmitted from the wireless communication terminal and that terminal's terminal ID information, a function to obtain transmission source location information and advertising information, which have been transmitted from a plurality of the advertising information transmission sources, a function to select neighborhood advertising information, which should be transmitted to the wireless communication terminal, from among a plurality of advertising information, based on the terminal location information and a plurality of the transmission source location information, a function to associate the terminal ID information with the neighborhood advertising information, and a function to transmit the neighborhood advertising information, which has been associated with the terminal ID information to the wireless communication terminal, and an advertising information display program to display the neighborhood advertising information on the display of the wireless communication terminal.

According to further aspect of the present invention, an advertising information transmission program, which is used for an advertising information display system which displays, on the display of a wireless communication terminal that is capable of transmitting location information, advertising information, which is transmitted from an advertising information transmission source that is capable of transmitting location information and advertising information, is characterized by operating a computer as a means to obtain the terminal location information transmitted from the wireless communication terminal and that terminal's terminal ID information, a means to obtain transmission source location information and advertising information, which have been transmitted from a plurality of the advertising information transmission sources, means to select neighborhood advertising information, which should be transmitted to the wireless communication terminal, from among a plurality of advertising information, based on the terminal location information and a plurality of the transmission source location information, a means to associate the terminal ID information with the neighborhood advertising information, and a means to transmit the neighborhood advertising information, which has been associated with the terminal ID information to the wireless communication terminal.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 3A and 3B are diagrams illustrating an example of the screen display of the display part of a mobile telephone device, which is used by the advertising information display system shown in FIG. 1.

DESCRIPTION OF THE EMBODIMENTS

Figure 1:
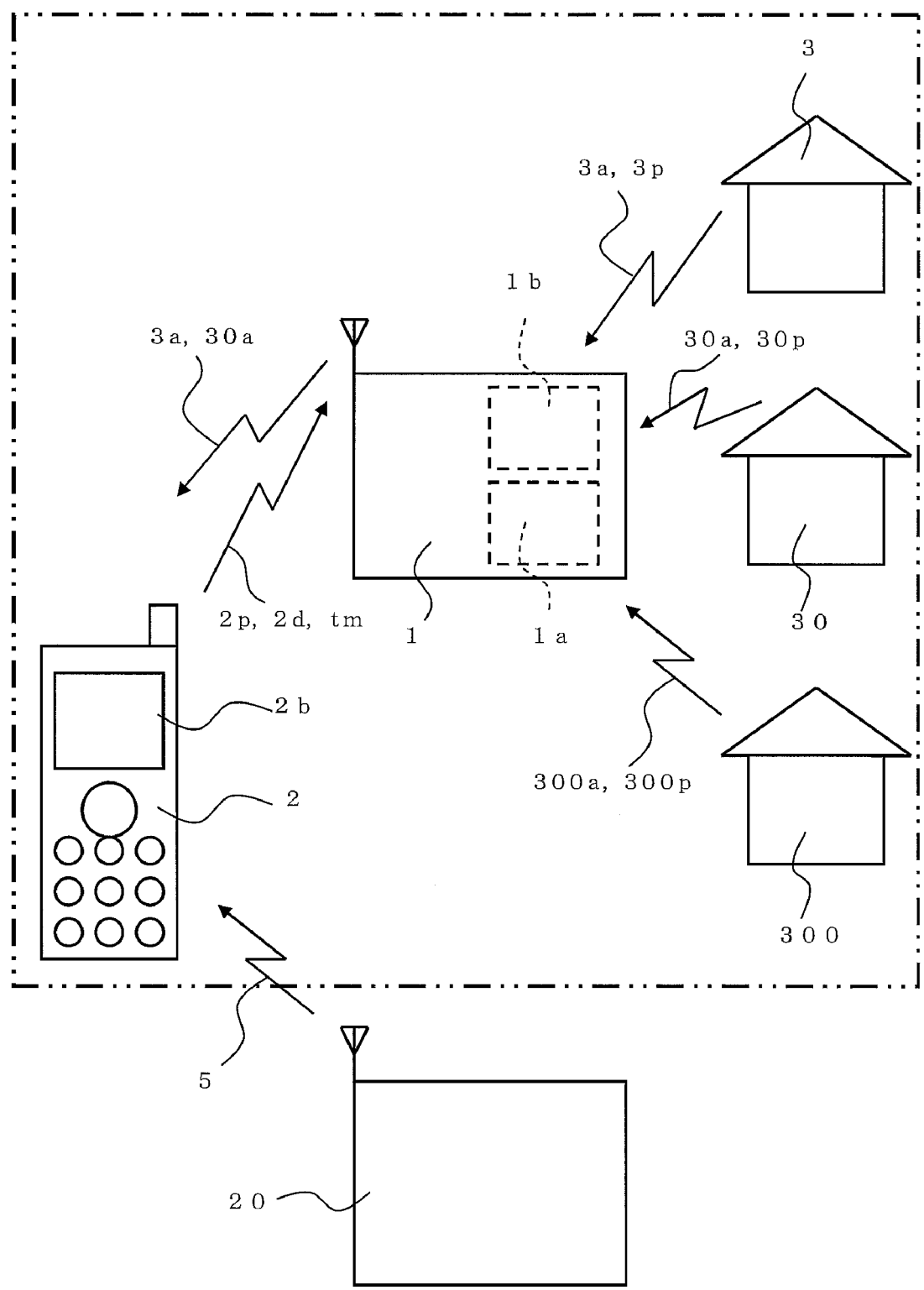
FIG. 1 is a schematic block diagram illustrating the relationship between the overall structure of an advertising information display system and an information providing server, according to the embodiment of the present invention.

The embodiments will now be described with reference to the accompanying drawings, wherein like reference numerals designate corresponding or identical elements throughout the various drawings. FIG. 1 is a schematic block diagram illustrating the relationship between the overall structure of an advertising information display system S and an information providing server 20, according to the embodiment of the present invention. This advertising information display system S includes an advertising server 1, which is configured to send/receive information between a mobile telephone device 2, and stores 3, 30, and 300 as advertising information sources. The information providing server 20 provides a web page 5 (also refer to FIGS. 3A and 3B) which can be browsed on a mobile telephone device 2.

The mobile telephone device 2 has a function to measure its location information (terminal location information) $2p$. The location measurement function may be one using the GPS (Global Positioning System) System, or one measuring the location by information sent/received between a plurality of mobile telephone base stations. A function to transmit the measured terminal location information $2p$ to the advertising server 1 is also provided.

The mobile telephone device 2 has a display $2b$ (also refer to FIGS. 3A and 3B) on a chassis $2a$, and a computer $2c$ within which a display program is stored. This display $2b$ is a liquid crystal display to display various functions of the mobile telephone, and advertising information described below is also to be displayed on this display $2b$.

The mobile telephone device 2 also has a terminal ID (terminal ID information) as individually different information allocated to each mobile telephone device. The terminal ID is the information used for identifying one mobile telephone device from among a plurality of mobile telephone devices, and it may be, for example, a serial number and a manufacturing number allocated for each terminal. A telephone number of the mobile telephone device can be used as terminal ID $2d$. The mobile telephone device 2 has a function to transmit the terminal ID $2d$ to the advertising server 1.

The display program configures a part of the advertising information display system S, and displays it on the display $2b$ based on the advertising information transmitted from the advertising server 1. The display program also has a function, as a display program, to determine the priority to display a plurality of the advertising information on the display $2b$, based on the ranking information.

The stores 3, 30, and 300 have a function to transmit the advertising information $3a$, $30a$, and $300a$ and the location information as their own location information (transmission source location information, hereinafter referred to as "store location information") $3p$, $30p$, and $300p$ to the advertising server 1. The store information $3a$ of the store 3 may include information about a discount coupon available in the store. As described below, the discount rate may be variable depending on the ranking of the advertising information 3a.

The advertising server 1 sends/receives the information between the mobile telephone device 2 and stores 3, 30, and 300, and includes a computer 1a within which an advertising information transmission program and an advertising information ranking program are stored.

The advertising information transmission program obtains the terminal location information 2p and the terminal ID 2d transmitted from the mobile telephone device 2, and includes a function to store these information as history information in a memory area 1b within the advertising server 1. Additionally, the advertising information transmission program obtains the advertising information 3a, 30a, and 300a and the store location information 3p, 30p, and 300p transmitted from stores 3, 30, and 300 and includes a function to store this information in the memory area 1b. Generally, a plurality of stores transmitting the advertising information and the advertising location information will exist, so a plurality of the advertising information and the store location information will also be obtained and stored.

The advertising transmission program includes a function to select neighborhood advertising information from among a plurality of the advertising information, based on the obtained terminal location information 2p and the store location information 3p, 30p, and 300p. In other words, if the location represented by the terminal location information 2p (terminal information) and the location represented by the store location information 3p (store location) are close by comparing the terminal location information 2p respectively with a plurality of the store location information 3p, 30p and 300p, the advertising information 3a corresponding to the store location information 3p will be selected as the neighborhood advertising information. In this case, the advertising information 3a of the store which is closest to the terminal location, may be selected as the neighborhood advertising information, but in this embodiment, the advertising information 3a, 30a, and 300a (also refer to FIGS. 3A and 3B) of the plurality of neighborhood (i.e. located within the prescribed range of the terminal location) stores 3 and 30 are selected as the neighborhood advertising information.

The advertising information transmission program includes a function to associate the terminal ID 2d with the selected neighborhood advertising information 3a and 30a and transmits the neighborhood advertising information 3a and 30a to the mobile telephone device 2. By associating this information, the neighborhood advertising information 3a and 30a can be transmitted to the mobile telephone device 2 based on the terminal ID 2d. Thus, it is not necessary to obtain the terminal location information 2p, whenever the neighborhood advertising information 3a and 30a are transmitted to the mobile telephone device 2.

The advertising information ranking program includes a function to obtain the time tm, when the terminal location information 2p has been transmitted from the mobile telephone terminal 2 (terminal location information transmission time). In this case, it is obviously not a problem even if the terminal location information transmission time tm is the time when the advertising server 1 has received the terminal location information 2p.

The advertising information display program performs a ranking of the neighborhood advertising information 3a and 30a based on the location information and the time information, and transmits the neighborhood advertising information 3a and 30a to the mobile telephone device 2 after the ranking information H3 and H30 are respectively associated with the neighborhood advertising information 3a and 30a. The ranking is performed by calculating the ranking information H3 and H 30 in accordance with the following procedures.

The time difference information (time difference) between the terminal location information transmission time tm and the advertising information transmission time ta when the neighborhood advertising information 3a is transmitted to the mobile telephone device 2, T3=ta−tm is calculated. The location difference information (distance) between the terminal location information 2p and the store location information 3p, L3=|3p−2p| is calculated. Furthermore, the ranking information H3 represented by the following formula is calculated.

$$H3 = k \times T3 \times L3 \text{ (where, k is coefficient)} \quad (1)$$

Likewise, the ranking information H30 represented by the following formula is calculated based on the time difference information between the terminal location information transmission time tm and the advertising information transmission time tb when the neighborhood advertising information 30a is transmitted to the mobile telephone device 2, T30=tb−tm, and the location difference information between the terminal location information 2p and the store location information 30p, L30=|30p−2p|.

$$H30 = k \times T30 \times L30 \text{ (where, k is coefficient)} \quad (2)$$

The advertising information display program of the mobile telephone device 2 has a function to match the terminal ID 2d received from the advertising server 1 and the terminal ID 2d within the mobile telephone device 2, a function to receive the neighborhood advertising information 3a and 30a respectively associated with the ranking information H3 and H30, and a function to display the neighborhood advertising information 3a and 30a on the display 2b after ranking based the ranking information H3 and H30. It is obviously not a problem that these multiple devices may be used respectively to perform different programs. In this case, smaller calculation rate of ranking information is placed at a higher priority. Thus, the neighborhood advertising information associated with low ranking information is displayed with a high ranking (i.e. preferentially).

Figure 2:
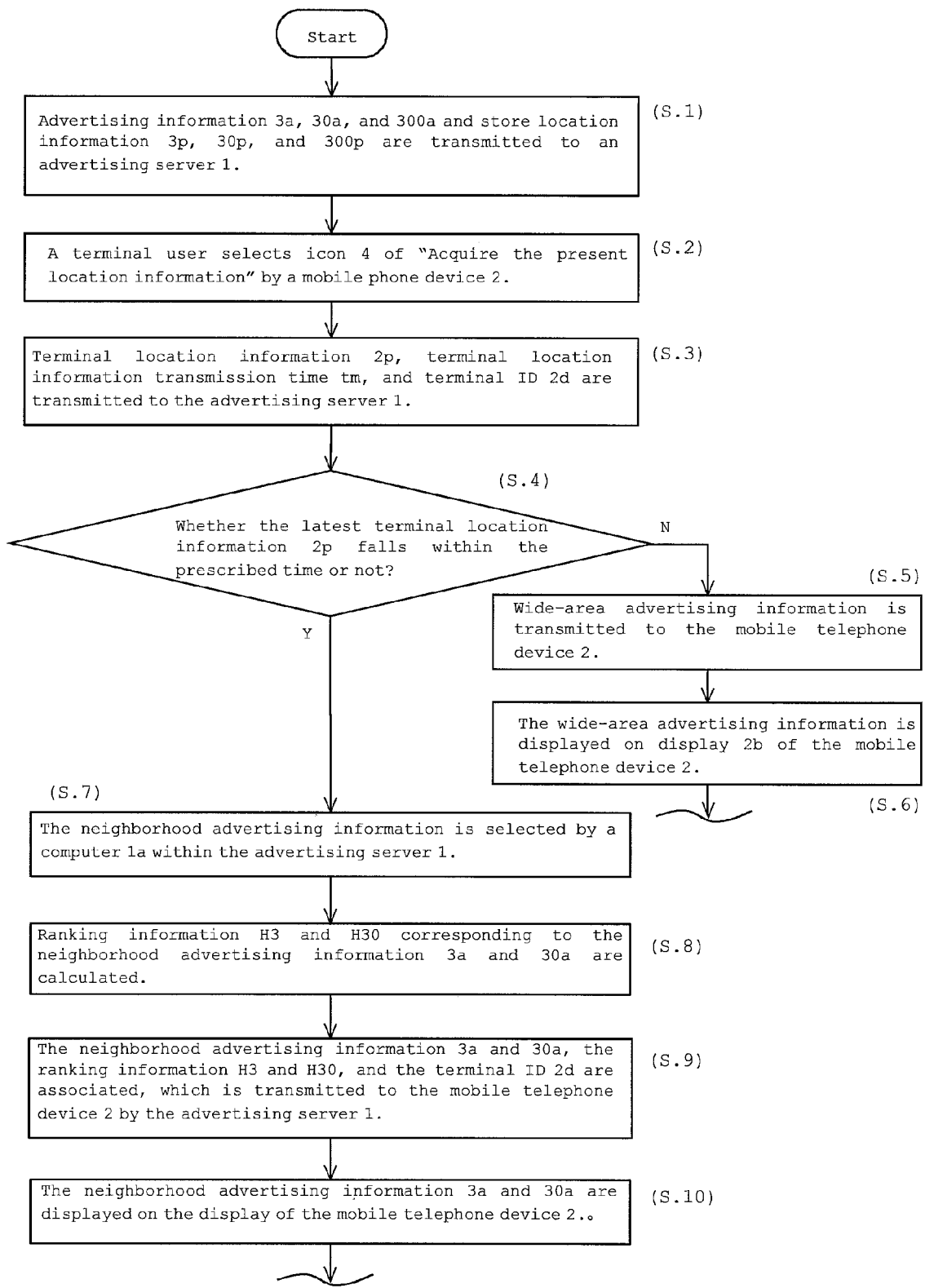
FIG. 2 is a flow chart illustrating the operation of the advertising information display system shown in FIG. 1.

Next, the operation of this advertising information display system S will be described, based on the flowchart shown in FIG. 2.

In advance, the advertising information 3a and its location information (store location information) 3p are transmitted to the advertising server 1. If there are a plurality of stores such as stores 3, 30, and 300, the advertising information 3a, 30a, and 300a and the store location information 3p, 30p, and 300p are respectively transmitted to the advertising server 1 (S.1). These advertising information 3a, 30a, and 300a are transmitted to the advertising server 1 from time to time and memorized in the memory area 1b.

A screen to prompt for the acquisition of the present location information is displayed on the display 2b of the mobile telephone device 2 in advance, as shown in FIG. 3A, when the user of the mobile telephone device 2 (terminal user) browses, for example, the web page 5 on the information providing server 20. At this moment, if the user selects the icon 4 of "Acquire the present location information" (S.2), the location information of the mobile telephone device 2 will be obtained by the location measurement system (for example, GPS system) and the information will be transmitted to the advertising server 1 (S.3). Together with that, the time tm, when the terminal location information 2p has been transmitted to the advertising server 1 (terminal location information transmission time), and the terminal ID 2d will be also transmitted to the advertising server 1 (S.3).

All of the terminal location information 2p, the terminal ID 2d, the terminal location information transmission time tm, the store location information 3p, 30p, and 300p, the advertising information 3a, 30a, and 300a, and the advertising information transmission time ta, which have been obtained by the advertising server 1, will be memorized in the memory area 1b within the advertising server 1 as history information. When the advertising information is transmitted to the mobile telephone device 2, it is judged whether or not the terminal location information transmission time tm of the latest terminal location information 2p of the history information is within the pre-set time (e.g. within 15 minutes of the time when the advertising information is intended to be transmitted) (S.4).

If the terminal location information transmission time tm is earlier than the prescribed time, wide-area advertising information will be transmitted to the mobile telephone device 2 (S.5). Also, the wide-area advertising information will be displayed on the prescribed part of the browsing web page on the display 2b of the mobile telephone device 2, which has received the wide-area advertising information (S.6).

Meanwhile, if the terminal location information transmission time tm is within the prescribed time, the neighborhood advertising information 3a and 30a will be selected by the computer 1a within the advertising server 1, based on the obtained terminal location information 2p, and the store location information 3p, 30p, and 300p which have been obtained in advance (S.7). In other words, the only advertising information 3a and 30a of the stores 3 and 30 located at the prescribed range which is judged to be close to the terminal location and highly useful to the terminal user will be selected as the neighborhood advertising information.

Additionally, the ranking information H3 and H30 for the selected neighborhood advertising information 3a and 30a are calculated by using the terminal location information 2p, the terminal location information transmission time tm, the store location information 3p and 30p, and the advertising information transmission time ta (S.8).

Figure 4:
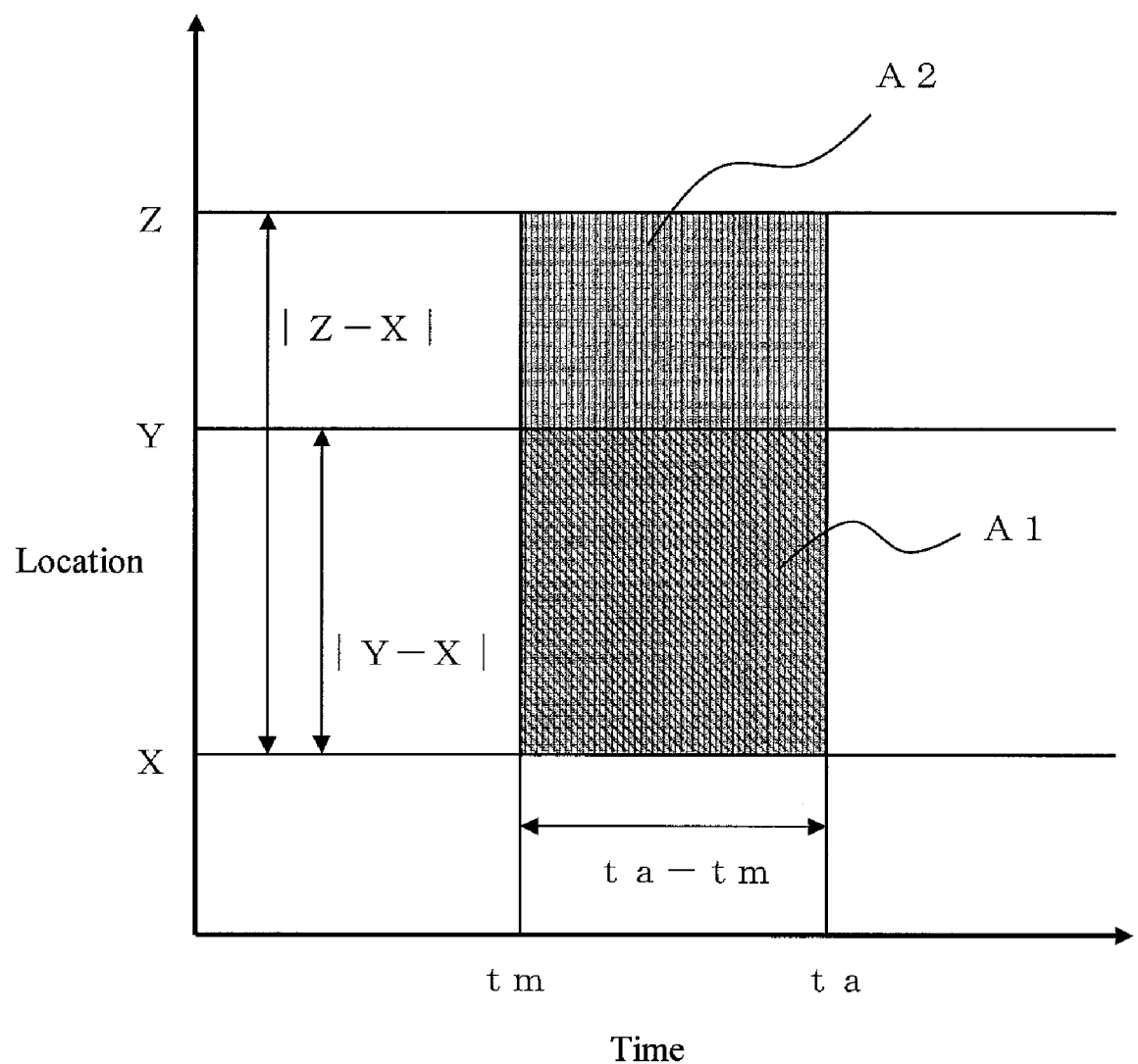
FIG. 4 is a diagram illustrating the principles of calculating ranking information.

The principle of calculation of the ranking information H3 and H30 will be described with the use of FIG. 4. In FIG. 4, a lateral axis represents the time and a longitudinal axis represents the location. It is assumed that the terminal location (the location corresponding to the terminal location information 2p) is X, the store location of the store 3 (the location corresponding to the store location information 3p) is Y, and the store location of the store 30 (the location corresponding to the store location information 30p) is Z. The terminal location information transmission time is tm. The ranking information H (H3 and H30) for each of advertising information 3a and 30a of the store 3 and 30 at the advertising transmission time ta when the advertising server 1 transmits the advertising information 3a and 30a to the mobile telephone device 2, are respectively calculated. For example, the ranking information H3 for the neighborhood advertising information 3a is represented by $$H3 = k \times (ta - tm) \times (|Y - X|) \quad (3)$$

and this will be the value corresponding to the area of rectangular area A1 shown by the cross hatching in FIG. 4. Meanwhile, the ranking information H30 for the neighborhood advertising information 30a is represented by $$H30 = k \times (ta - tm) \times (|Z - X|) \quad (4)$$

and this will be the value corresponding to the area of rectangular area A2 (the area encompassing the rectangular area A1) shown by cross hatching in FIG. 4.

As is apparent from FIG. 4, the area of the rectangular area A1 is smaller than the area of the rectangular area A2. Accordingly, the ranking information H3 is smaller than the ranking information H30 and the neighborhood advertising information 3a is to be placed at a higher priority than the neighborhood advertising information 30a. The advertising information 3a and 30a are transmitted to the mobile telephone device 2 by the advertising server 1 after these ranking information H3 and H30 are respectively associated with the neighborhood advertising information 3a and 30a, and the terminal ID 2d is also further associated with the neighborhood advertising information 3a and 30a (S.9).

The neighborhood advertising information 3a and 30a are displayed on the prescribed part in the browsing web page 5 of the information providing server 20, on the display 2b of the mobile telephone 2 which has received the neighborhood advertising information 3a and 30a, as shown in FIG. 3B (S.10). At this moment, the neighborhood advertising information 3a and 30a are displayed based on the respective ranking information H3 and H30. In other words, the neighborhood advertising information 3a corresponding to the ranking information H3 having a high priority is preferentially displayed compared to the neighborhood advertising information 30a corresponding to the ranking information H30 having a low priority. As used herein, "preferentially display" means, for example, displaying on the upper or the top part, displaying in an enlarged manner, and displaying by the addition of a more outstanding icon.

As the neighborhood advertising information 3a and 30a are associated with the terminal ID 2d, it is ensured that the neighborhood advertising information 3a and 30a are transmitted to the mobile telephone device 2 having that terminal ID 2d. For example, if the terminal user displays the information from different information providing server (not shown) on the display 2b by moving to web page 5, the advertising server 1 can transmit the neighborhood advertising information 3a and 30a associated with the terminal ID 2d to the mobile telephone device 2 without obtaining additional terminal location information 2p. Thus, the neighborhood advertising information 3a and 30a are to be displayed on the prescribed part of the new web page 5 which is displayed after moving, even though the terminal user does not perform an operation to send the terminal location information repeatedly.

The accuracy of the ranking of the neighborhood advertising information can be further improved, if the coefficient k of the above formula has moving speed information or moving direction information of the mobile telephone device 2. Even though the time difference T (T3 and T30) are the same value, the distance which the mobile telephone device 2 moves within the time difference T is variable depending on the moving speed of the mobile telephone device 2, but the coefficient k including the moving speed information can compensate for that influence. For example, the value of the coefficient k is large in the case of moving at the high moving speed, and the ranking information H that is calculated will be larger even though the time difference T is the same. Thus, such advertising information can be placed at a low priority.

If the coefficient k includes the moving direction information, that is, the information on the moving direction of the mobile telephone device 2 within the time difference T, it is possible to much more accurately rank the advertising information that is highly useful and the advertising information that is not highly useful at the advertising information transmission time. The moving speed information and moving direction information of the mobile telephone device 2 can be estimated by a plurality of the terminal location information $2p$ that had been obtained by the advertising server in the past.

The ranking information H may be also calculated based on the addition of the time difference T and the distance L. In this case, when the ranking information H is smaller, the advertising information is also considered to be more highly useful, and that order is to be placed at a high priority. The weighting coefficients $c1$ and $c2$ are multiplied respectively by the time difference T and the distance L, and H may be calculated as $$H=k(c1 \times T + c2 \times L) \qquad (5)$$

Accordingly, the advertising information can be judged to be highly useful by emphasizing one of the time difference T or the distance L.

It is also possible to estimate the location of the mobile telephone device 2 having a specific terminal ID 2d based on the history information which has been stored in the memory area 1b of the advertising server 1. In other words, if a plurality of the history information of the terminal location information $2p$ from the mobile telephone device 2 which have been stored in the memory area 1b, have a correlation with that terminal location on the specific day and the specific day of the week, or at the specific time, that location information will be highly accurately estimated without obtaining the terminal information $2p$ of that mobile telephone device 2 at the time when the advertising server 1 intends to transmit the advertising information. Accordingly, the advertising information can be selected and transmitted to the mobile telephone device 2 based on that location information. For example, in the above (S.4) step, in the case that the latest terminal location information transmission time tm is earlier than the prescribed time, if the terminal location can be estimated by the history information of the terminal location information, the neighborhood information based on the estimated terminal location other than the wide-area advertising information can be transmitted to the mobile telephone device 2. The wide-area advertising information can also be transmitted if it is impossible or hard to estimate the terminal location.

In the above embodiment, an advertising information ranking program is stored in the computer 1a within the advertising server 1 and that program calculates the ranking information, but the computer 2c within the mobile telephone device 2, of course, may receive the time difference information T3 and T30, and the location difference information L3 and L30 together with the neighborhood advertising information from the advertising server 1 and calculate the ranking information H3 and H30 associated with the advertising information 3a and 30a.

Furthermore, in this embodiment, the priority of displaying the advertising information based on the ranking information (i.e. the order of display/the size of display/addition of an outstanding icon, etc.) is determined, but the discount rate of the coupon available for the store, which has sent the advertising information, may be varied based on the ranking information.

The advertising information becomes attractive to the user by causing the high discount rate of the coupon to correspond to the advertising information having low ranking information and the high priority, which can lead to the high advertising effectiveness by improving the appeal power. Meanwhile, on the contrary, the advertising effectiveness can be enhanced in advertising information having low advertising effectiveness according to the attractiveness of the rate of the coupon by causing the high discount rate of the coupon to correspond to the advertising information having high ranking information and low priority.

As the advertising information having the low ranking information and the high priority can obtain the high advertising effectiveness, advertising fees which are worth the advertising effectiveness can be charged. Thus, the advertising fees which are worth the advertising effectiveness can be automatically charged by adjusting the charging of the advertising fees according to the ranking information of the advertising information.

As used herein, terminal ID information means information which is used for identifying one wireless communication terminal from among a plurality of wireless communication terminals (terminal ID), and it may be, for example, a serial number or a manufacturing number allocated for each terminal. A telephone number can be used as terminal ID information, if the wireless communication terminal is a mobile telephone terminal.

As the neighborhood advertising information, which should be transmitted to the wireless communication terminal, is selected based on the location information from the wireless communication terminal (terminal location information) and the location information from the advertising information transmission source (transmission source location information), the advertising information of the advertising information transmission source (for example, a store) located close to the location where the user of the wireless communication terminal (hereinafter referred to merely as a "terminal user") is located, can be selected. Thus, highly useful advertising information for the terminal user can be selected. The terminal user also can view the advertising information easily and conveniently, as the selected neighborhood advertising information is transmitted to the wireless communication terminal and displayed on its display.

It is not necessary to obtain the terminal location information whenever the advertising information is transmitted, as the obtained terminal ID information of the wireless communication terminal is associated with the selected neighborhood advertising information, and the associated advertising information can be transmitted when the advertising information is transmitted to the wireless communication terminal corresponding to the terminal ID information. Thus, even if the terminal user moves to a different web-browser page, it is possible to obtain highly useful neighborhood advertising information without the need to perform an operation to transmit the terminal location information again.

The advertising information display method may further have a step to obtain a terminal location information transmission time when the terminal location information has been transmitted from the wireless communication terminal, a step to perform a ranking of the neighborhood advertising information, based on time difference information between the advertising information transmission time when the neighborhood advertising information has been transmitted to the wireless communication system, and the terminal location information transmission time, as well as location difference information between the terminal location information and transmission source location information, a step to associate the neighborhood advertising information with the ranking information, and a step to display the neighborhood advertising information on the display of the wireless communication terminal, based on the ranking information.

If a plurality of the advertising information transmission sources are located near the location corresponding to the location information of the wireless communication terminal (terminal location information), a ranking of each item of advertising information transmitted by these advertising information transmission sources is performed, and the advertising information is displayed on the display of the wireless communication terminal based on the ranking information.

More particularly, the ranking of the advertising information is performed based on the location difference information (i.e. distance information) between the terminal location information and the location information of the advertising information transmission source (transmission source location information), and the time difference information (i.e. time information) between the time when an advertising server, etc. transmits the advertising information to the wireless communication system (advertising information transmission time) and the time when the wireless communication terminal has transmitted the terminal location information (terminal location information transmission time). Accordingly, the advertising information, which is more effectively used by the terminal user, can be displayed preferentially. If the wireless communication terminal is a mobile telephone terminal, such high advertising effectiveness can be obtained in mobile telephones, which have a high prevalence rate.

The above advertising information display method may further have at least one of: a step to determine the order of displaying the advertising information on the display of the wireless communication terminal based on ranking information, a step to change the rate of preferential treatment in the advertising information transmission source that transmits the advertising information, and a step to adjust the charging of the advertising fees to the advertising information transmission source.

The order of displaying the advertising information on the display is determined based on the ranking information, so highly useful information to the terminal user can be displayed in the order of high priority (for example, on the top). Therefore, it is convenient for the terminal user, and it is possible for the advertising information transmission source to obtain high advertising effectiveness.

High advertising effectiveness can be obtained by changing the rate of preferential treatment within the advertising information transmission sources based on the ranking information. As used herein, the rate of preferential treatment in the advertising information transmission source is, for example, the discount rate of a coupon available in a store as an advertising information source. In cases where advertising information having higher effectiveness for the terminal user could be provided (in other words, high ranking information could be obtained), the advertising information transmission source can obtain the synergistic effects of the advertising information by setting a high discount rate for the coupon, and thus increase high advertising effectiveness. On the contrary, if only advertising information having low effectiveness could be provided (in other words, only low ranking information could be obtained), it would be possible to compensate for the advertising effectiveness by setting a high discount rate for the coupon.

In a ranking step, when the time difference based on the time difference information between the advertising information transmission time and the terminal location information transmission time is represented as T, and the distance based on the location difference information between the terminal location information and transmission source location information is represented as L, it is preferable that the order of the neighborhood advertisement information where the ranking information H represented by $H=k \times T \times L$ (where, k is a coefficient) is small, is to be placed at a higher priority than the ranking of the neighborhood advertising information where the ranking information H is large.

Accordingly, when the time difference T is small and the distance L is also small, the priority of the neighborhood advertising information can be high. Even if the terminal user is moving, if the advertising information transmission time is close to the terminal location information transmission time (in other words, the time difference is small), it can be judged that the location where the terminal user is located at the advertising information transmission time is not very far from the location corresponding to the terminal location information. Thus, the advertising information is to be treated as a high priority, because the advertising information transmitted at the advertising information transmission time can be judged to be highly useful.

Meanwhile, the closer the location where the terminal user is located is to the location of the advertising information transmission source (in other words, the smaller the distance L is), the higher the priority with which the advertising information is to be treated, because the advertising information of the advertising information transmission source can be judged to be more highly useful. In other words, when the ranking information H, which is calculated based on the multiplication of the time difference T and the distance L, is smaller, the advertising information is considered to be more highly useful, and such advertising information is to be placed at a high priority.

The ranking information H may be also calculated based on the addition of the time difference T and the distance L. In this case also, it can be considered that the smaller the ranking information H, the more highly useful the advertising information is, and the ranking is to be placed at a high priority. The weighting coefficients $c_1$ and $c_2$ are multiplied respectively by the time difference T and the distance L, and H may be calculated as $$H=k(c_1 \times T + c_2 \times L)$$

Accordingly, the advertising information can be judged to be highly useful by emphasizing either the time difference T or the distance L.

The coefficient k may include at least one of moving speed information or moving direction information. Even though the time difference T is the same value, the distance through which the wireless communication terminal moves within the time difference T is variable, depending on the moving speed of the wireless communication terminal, but the coefficient k, which includes the moving speed information, can compensate for that effect. For example, the value of the coefficient k is large in the case of moving at a high moving speed, and the ranking information H which is calculated will be larger even though the time difference T is the same. Thus, such advertising information can be placed at a low priority.

Additionally, the coefficient k includes the moving direction information, that is, the information on the moving direction of the wireless communication terminal within the time difference T, which can much more accurately rank the advertising information that is highly useful and the advertising information that is not highly useful at the advertising information transmission time.

The prescribed memory device may have a step of memorizing the history information of the terminal location information, the history information of the terminal ID information, and the history information of the neighborhood advertising information. These items of history information can be effectively used in various ways by memorizing the history information in the memory device. For example, by managing the history information, various statistical data can be calculated, and the data on fees to be charged to the advertising information transmission source that is providing the advertising information can also be calculated. It is also possible to estimate various current situations (e.g. the terminal location information) without obtaining new information, by using the past information.

When the latest item in the history information of the terminal location information is earlier than the prescribed time, a step to transmit, to the wireless communication terminal, wide-area advertising information different from the neighborhood advertising information and a step to display the wide-area advertising information on the display of the wireless communication terminal, may be further included.

If the history information of the terminal location information is too old, in some cases, there is a possibility that the terminal user is not close to the location displayed by the terminal location information at the time. In that case, the neighborhood advertising information is not transmitted and displayed by using the history information, but the wide-area advertising information other than the neighborhood advertising information is transmitted to the wireless communication terminal. That will make the advertising information highly useful for the terminal user. As used herein, wide-area advertising information means the advertising information that has not been selected based on the terminal location information (in other words, based on the reason that it is closer to where the terminal user is located), and includes, for example, the advertising information of nationwide chain stores and the advertising information for various products and companies, etc.

A step may be further included to estimate the location information of the wireless communication terminal based on the history information of the terminal location information, and a step to select the neighborhood advertising information that should be transmitted to the wireless communication terminal from among a plurality of the advertising information, based on the estimated terminal location information, which has a speculative basis, and a plurality of the transmission source location information.

If the statistical analysis of the history information of the terminal location information turns out to be such that the history information of the terminal location information of the wireless communication terminal corresponding to specific terminal ID information falls in the range of roughly defined area at the same time on the same day of the week, it can be estimated that the wireless communication terminal will be in the range of that defined area at that time on that day of the week. Thus, by using the history information, highly useful neighborhood advertising information corresponding to the terminal ID information can be transmitted to the wireless communication terminal without obtaining additional terminal location information.

If the wireless communication terminal is a mobile telephone terminal, the various forms of effectiveness described above can be obtained in mobile telephone terminals, which have a high prevalence rate, and the advertising information which is highly useful to the terminal user can be displayed on the display of the mobile telephone terminal.

As the advertising server selects the neighborhood advertising information, which should be transmitted to the wireless communication terminal, based on the obtained location information and the transmission source location information, the advertising information of the advertising information transmission source (e.g. a store) existing close to the location where the terminal user is located, can be selected. Thus, the advertising server can select highly useful advertising information to the terminal user. The terminal user also can see the advertising information easily and conveniently, as the advertising information display program displays the neighborhood advertising information which has been selected and transmitted to the wireless communication terminal on the terminal's display.

It is not necessary to obtain the terminal location information whenever the advertising information is transmitted, as the terminal ID information of the wireless communication terminal obtained by the advertising server is associated with the selected neighborhood advertising information, and the associated advertising information can be transmitted when the advertising information is transmitted to the wireless communication terminal corresponding to the terminal ID information. Thus, even in the case where the terminal user moves to another page in the web browser, the terminal user can obtain highly useful neighborhood advertising information without the need to perform an operation to transmit additional terminal location information.

As described below in the embodiment, an advertising information display system can be composed of, for example, a mobile telephone terminal as a wireless communication terminal, an advertising server transmitting the advertising information, and a GPS system measuring the terminal location and the transmitting source location, and that system can display the neighborhood advertising information on the display of the wireless communication terminal when the terminal user browses the information on the web page provided by the information providing server. In other words, the information providing server transmits the web page information to the mobile telephone terminal when the terminal user browses the web page by using the mobile telephone terminal. In such cases, the advertising server selects the neighborhood advertising information and transmits it to the mobile telephone terminal, by using the terminal location information, the transmission source location information, and the terminal ID information obtained in advance by using the GPS system. The neighborhood advertising information is displayed by the advertising information display program so as to be incorporated into the prescribed part of the web page being browsed.

As the neighborhood advertising information, which should be transmitted to the wireless communication terminal, is selected based on the obtained location information and the transmission source location information, the advertising information of the advertising information transmission source (e.g. a store) existing close to the location where the terminal user is located, can be selected. Thus, highly useful advertising information to the terminal user can be selected. It is not necessary to obtain the terminal location information whenever the advertising information is transmitted, as the obtained terminal ID information is associated with the selected neighborhood advertising information, and the associated advertising information can be transmitted when the advertising information is transmitted to the wireless communication terminal corresponding to the terminal ID information. Thus, even in the case where the terminal user moves to another web browser page, the terminal user can obtain highly useful neighborhood advertising information without the need to perform an operation to transmit additional terminal location information.

According to the embodiment of the present invention, advertising information that is highly useful to a terminal user, that is, the advertising information of advertising information sources existing close to where the terminal user is located, can be displayed on the terminal's display by using terminal location information, transmission source location information, and terminal ID information. Thus, it is convenient for the user of the wireless communication terminal, and it is possible for the advertising information provider to obtain high advertising effectiveness. It is not necessary to obtain the terminal location information whenever the advertising information is transmitted, so the terminal user does not have to perform the operation of transmitting its location information repeatedly.

It is obvious that the present invention is not limited to the above-described embodiment, but can be applied to, for example, motorcycles or three-wheeled vehicles without limiting to the saddle-ride type four-wheeled vehicles, and various modifications can be made in a range without departing from the gist of the invention.

What is claimed as new and desired to be secured by Letters Patent of the United States is:

1. An advertising information display method, which displays advertising information on a display of a communication terminal that is capable of transmitting location information, said advertising information is transmitted from an advertising information transmission source that is capable of transmitting location information and advertising information, where the method comprising:
 a step to obtain terminal location information transmitted from the communication terminal,
 a step to obtain a terminal location information transmission time when the terminal location information has been transmitted from the communication terminal,
 a step to obtain transmission source location information and advertising information, which have been transmitted from a plurality of the advertising information transmission sources,
 a step to select neighborhood advertising information, which should be transmitted to the communication terminal, from among a plurality of the advertising information, based on the terminal location information and a plurality of the transmission source location information,
 a step to perform a ranking of the neighborhood advertising information, based on time difference information between advertising information transmission time when the neighborhood advertising information has been transmitted to the communication system, and the terminal location information transmission time, as well as location difference information between the terminal location information and the transmission source location information,
 a step to associate the neighborhood advertising information with the ranking information,
 a step to transmit said neighborhood advertising information to the communication terminal; and
 a step to display the neighborhood advertising information on the display of the communication terminal, based on said ranking information.

2. The advertising information display method according to claim 1, wherein said ranking step further includes putting a higher priority on the rank of the neighborhood advertisement information where the ranking information H represented by the following formula is low, than the rank of the neighborhood advertising information where the ranking information H is high, where the time difference basing on the time difference information between the advertising information transmission time and the terminal location information transmission time, is represented as T, and the distance basing on the location difference information between the terminal location information and the transmission source location information, is represented as L.

$H = k \times T \times L$ (where k is a coefficient)

3. The advertising information display method according to claim 2, wherein the coefficient k includes at least one of moving speed information or moving direction information of the communication terminal.

4. The advertising information display method according to claim 1 further comprising a step to memorize, in the prescribed memory device, the history information of the terminal location information and the history information of the neighborhood advertising information.

5. The advertising information display method according to claim 4 further comprising:
 a step to transmit, to the communication terminal, wide-area advertising information different from the neighborhood advertising information, when the latest of the history information of the terminal location information is earlier than a prescribed time; and
 a step to display said wide-area advertising information on the display of the communication terminal.

6. The advertising information display method according to claim 4 further comprising:
 a step to estimate location information of the communication terminal based on history information of the terminal location information; and
 a step to select the neighborhood advertising information which should be transmitted to the communication terminal from among a plurality of the advertising information, based on estimated terminal location information that is on the estimation basis and on a plurality of the transmission source location information.

7. The advertising information display method according to claim 1, wherein the communication terminal is a mobile telephone terminal.

8. An advertising information display system, which displays advertising information on a display of a communication terminal that is capable of transmitting location information, said advertising information is transmitted from an advertising information transmission source that is capable of transmitting location information and advertising information, where the system comprising:
 an advertising server including,
 a function to obtain terminal location information transmitted from the communication terminal,
 a function to obtain a terminal location information transmission time when the terminal location information has been transmitted from the communication terminal,
 a function to obtain transmission source location information and advertising information, which have been transmitted from a plurality of the advertising information transmission sources,
 a function to select neighborhood advertising information, which should be transmitted to the communication terminal, from among a plurality of the advertising information, based on the terminal location information and a plurality of the transmission source location information,
 a function to perform a ranking of the neighborhood advertising information, based on time difference information between advertising information transmission time when the neighborhood advertising information has been transmitted to the communication system, and the terminal location information transmission time, as well as location difference information between the terminal location information and the transmission source location information,
 a function to associate the neighborhood advertising information with the ranking information,
 a function to transmit said neighborhood advertising information to the communication terminal; and
 an advertising information display program to display the neighborhood advertising information on the display of the communication terminal, based on said ranking information.

* * * * *